United States Patent

[11] 3,576,954

[72] Inventor Edward C. Sand
Willoughby, Ohio
[21] Appl. No. 759,842
[22] Filed Sept. 16, 1968
[45] Patented May 4, 1971
[73] Assignee Clevite Corporation

[54] METHOD OF LOW POWER BIAS, LOW DISTORTION MAGNETIC RECORDING
5 Claims, 6 Drawing Figs.

[52] U.S. Cl. .......... 179/100.2, 346/74
[51] Int. Cl. .......... G11b 5/02, G11b 5/44
[50] Field of Search .......... 179/100.2 (CB), 100.2 (C), 100.2 (K), (MI)

[56] References Cited

UNITED STATES PATENTS

| | | | |
|---|---|---|---|
| 2,419,195 | 4/1947 | Begun .......... | 179/100.2 |
| 2,497,654 | 2/1950 | Begun .......... | 179/100.2 |
| 3,032,765 | 5/1962 | Begun et al. .......... | 179/100.2 |

FOREIGN PATENTS

| | | | |
|---|---|---|---|
| 801,698 | 8/1936 | France .......... | 179/100.2 |

*Primary Examiner*—Bernard Konick
*Assistant Examiner*—William F. White
*Attorney*—Eber J. Hyde

ABSTRACT: A method of magnetic recording is provided which utilizes an AC signal flux recorded in conjunction with DC bias flux which biases the magnetic tape to the knee portion of the remanent magnetization characteristic of the magnetic record medium. By using two tracks in the same medium and suitable distribution of signals, the method provides low distortion overall although each individual track is severely distorted.

PATENTED MAY 4 1971

3,576,954

INVENTOR.
EDWARD C. SAND

BY Elmer J. Hyde

ATTORNEY

METHOD OF LOW POWER BIAS, LOW DISTORTION MAGNETIC RECORDING

BACKGROUND OF THE INVENTION

This invention relates to methods of magnetic recording and reproducing. More particularly, this invention relates to a method of magnetic recording for providing low power, low distortion magnetic recordings on a magnetic record medium. This method of magnetic recording can be used in magnetic recording systems for such applications as space satellite recorders and portable audio tape recorders.

For an understanding of the present invention, reference is made to the nature and appearance of the well-known remanent magnetization curve of a magnetic record medium as shown in FIG. 2 of the drawing. This curve has an instep portion and a knee portion separated by a relatively linear portion, as indicated in each of the first and third quadrants, assuming that the curve is symmetrical about the origin. When the system for recording is not provided with bias, signals have to pass through the insteps of the curve and thereby are recorded in a nonlinear manner. Recording in the linear range between the insteps and the knees in each quadrant through which the characteristic curve extends provides a more linear recording. The prior art has used this substantially linear region and has taught modifications and simplifications to make lower distortion recording possible. However, the curve is never quite straight so that distortion has a minimum value which depends on magnetization characteristics, the amplitude of the signal, and the bias point.

In prior art DC bias magnetic recording systems, it has been taught that for lowest distortion the system should operate at the most linear portion of the remanent magnetization characteristic curve of the magnetic record medium. For example, the signal can operate in the most linear region if the DC bias shifts the operating region to swing around point P of the curve in FIG. 2. In other prior art techniques, as shown by U.S. Letters Pat. No. 2,419,195, Begun, issued Apr. 22, 1947, and U.S. Letters Pat. No. 2,497,654, Begun, issued Feb. 14, 1950, both assigned to the same assignee as the present invention, only the essentially linear portions of the magnetization curve are used.

In the past, it also has been taught that AC bias systems can operate with distortion reduced to the order of 1 percent. However, to achieve these results, the AC bias power must be on the order of 1 watt. Furthermore, if AC erasure is employed, the power requirements are increased to the order of 5 watts. Also, the AC bias systems have poor high frequency response because of trailing effect, i.e., as the bias current reverses while the recorded medium is still in the vicinity of the gap, it tends to erase the recorded signal.

In a general summary of the prior art, the AC bias systems, while providing low distortion on the order of 1 percent, have rather high power requirements; on the other hand, the DC bias systems, while providing low power requirements on the order of milliwatts, have high distortion on the order of 5 percent.

The main object of the present invention is to provide a method of magnetic recording which provides both low power and low distortion, i.e., power requirements on the order of milliwatts and distortion on the order of 1 percent.

A further object of the present invention is to provide a method of low power, low distortion magnetic recording which can be incorporated in a very small package to make it useful in such applications as satellite and audio tape recorders.

A still further object is to provide a magnetic recording system which provides excellent response to high frequency signals.

An object of the present invention is to provide a method of magnetic recording which operates in a region where the bias magnetization can vary, yet achieve approximately 1 percent distortion.

In accordance with the present invention, a method of magnetic recording is provided having a flux producing means in combination with two-track portions in a magnetic record medium having a magnetization characteristic which has saturation knee portions. The flux producing means applies a DC bias flux to the first track portion of the record medium to bias it to a saturation knee portion of the magnetization curve, and simultaneously applies DC flux to the second portion of the record medium to bias it to a saturation knee portion of the magnetization curve. The flux producing means applies an AC input signal flux to both track portions of the record medium so that the AC flux is added to the DC bias flux applied to the first track portion, and the AC flux is subtracted from the DC bias flux applied to the second track portion.

The invention will be better understood from the following description of a preferred embodiment to be read in conjunction with the accompanying drawing, and the features believed to be novel will be more particularly pointed out in the appended claims.

DESCRIPTION OF THE PREFERRED EMBODIMENTS

Figure 1:
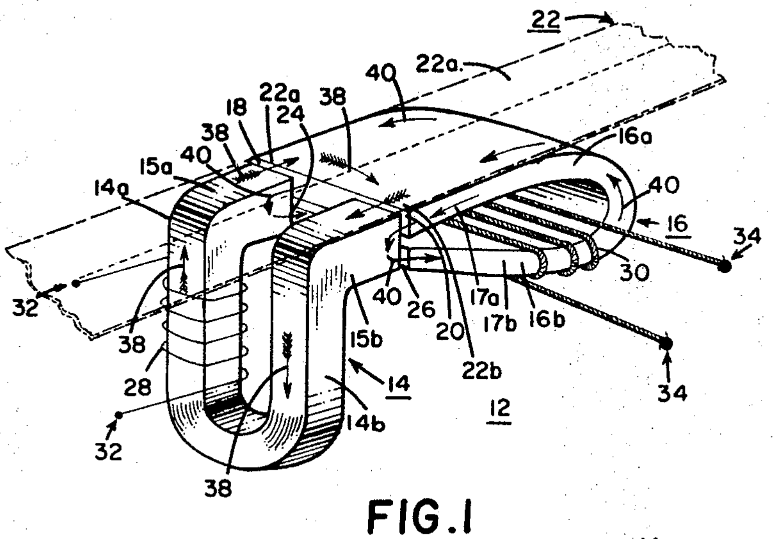
FIG. 1 is a perspective view of a magnetic recording system employing the method of magnetic recording of the present invention and showing the flux producing means in contact with a magnetic record medium.

Referring to FIG. 1 of the drawing, there is shown a magnetic recording system using the method of the present invention. Flux producing means, or magnetic recording head 12, is comprised of two magnetic core portions 14 and 16.

The magnetic core portion 14 is generally U-shaped having leg portions 14*a* and 14*b*. The leg portions 14*a* and 14*b* have pole tip portions 15*a* and 15*b* which are spaced parallel and adjacent to each other. The pole tip portions 15*a* and 15*b* are spaced a sufficient distance from each other so that the flow of flux in one pole tip portion does not prohibit the flow of flux in the opposite direction in the other pole tip portion. In operation, when flux flows unilaterally through core portion 14, the flux flow relative to the magnetic record medium 22 is bilateral.

The magnetic core portion 16 is generally U-shaped having one leg portion 16*a* folded back upon the other leg portion 16*b* as shown in FIG. 1. The leg portions 16*a and 16b* have pole tip portions 17*a* and 17*b* which are spaced and one is above the other. The pole tip portions 17*a* and 17*b* are so arranged relative to the magnetic record medium 22 so that in operation when flux flows unilaterally through core portion 16, the flux flow relative to the magnetic record medium 22 is unilateral.

The magnetic core portion 14 abuts the magnetic core portion 16 so that the pole tip portions 15*a* and 15*b* abut pole tip portion 17*a* to form two spaced front gaps 18 and 20. Likewise, the pole tip portions 15*a* and 15*b* abut the pole tip portion 17*b* to form two spaced rear gaps 24 and 26. The moving magnetizable record medium or record medium 22 is positioned across the two front gaps or transducing gaps 18 and 20 during a transducing operation.

Core portion 14 has a coil means 28 wound around it, and core portions 16 has a coil means 30 wound around it. The coil means 28 and 30 have lead-in terminals 32 and 34, respectively. As is well known in the art, during the recording operation the coil means 28 and 30 are electrically energized by external means (not shown) to establish magnetic flux in the core portions 14 and 16. Leakage flux at the transducing gaps 18 and 20 couples the magnetic record medium 22 to effect the recording.

The term "knee portion" as used in this application means that curved portion of the remanent magnetization characteristic curve near the saturation portion of the curve. The knee is in general a parabolic-type curve which adheres to square law theory, i.e., the addition of corresponding portions of this curve, one from the first quadrant and one from the third quadrant produces a resultant linear function with the second order terms cancelling.

Figure 2:
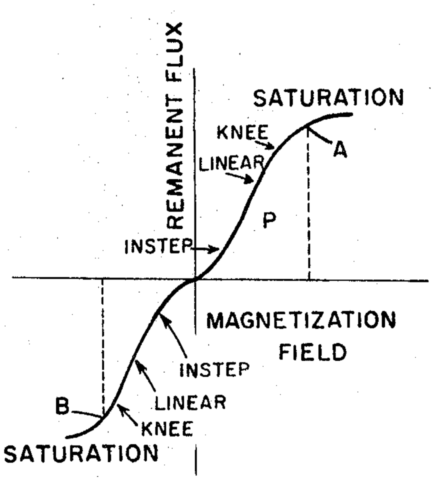
FIG. 2 is a graphic illustration of a typical remanent magnetization characteristic curve of a magnetic record medium.

In accordance with one aspect of the present invention and as shown in FIG. 1, DC bias current is applied to the terminals 32 of coil means 28. This current establishes a magnetic DC bias flux in core portion 14 as indicated by the arrows 38 (feathered at the end). The DC bias flux crosses transducing gap 18 in one direction and transducing gap 20 in the opposite direction. As the moving magnetic record medium 22 passes over the transducing gaps 18 and 20 the DC bias flux across gap 18 biases the adjacent track portion **22*a* of the magnetic record medium 22 to one knee of the remanent magnetization curve, e.g., to point A on the remanent magnetization curve in FIG. 2. Simultaneously, the DC bias flux across gap 20 biases the adjacent track portion 22*b* of the magnetic record medium 22 to an opposite knee of the remanent magnetization characteristic curve, e.g., to point B on the remanent magnetization characteristic curve in FIG. 2. Thus, DC bias current shifts the operating points to the left and right (as shown in FIG. 2**).

Simultaneously, the AC signal current of the signal to be recorded is applied to terminals 34 of coil means 30, and a signal flux is established in core portion 16 as shown by arrows 40 (not feathered). This flux crosses the transducing gaps 18 and 20 in the same direction.

Figure 4:
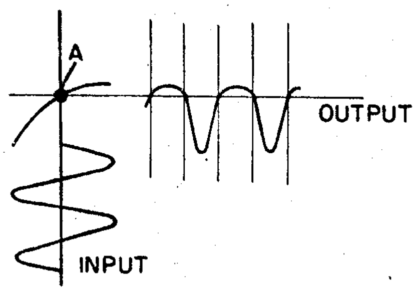
FIGS. 4 and 5 are graphical illustrations of the effect of the knee region of the remanent magnetization characteristic curve on normal sine wave curves.
Figures 5, 6:
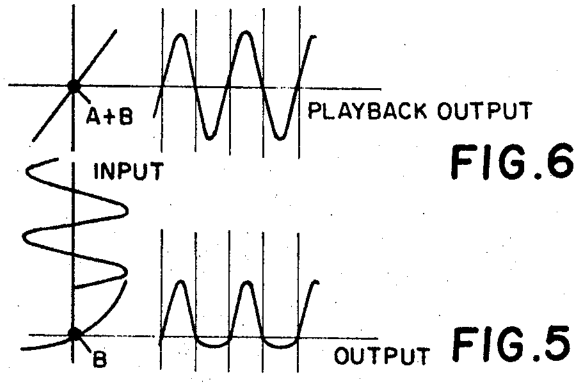
FIG. 6 is the resultant of adding the curves from FIGS. 4 and 5, in accordance with the present invention.

The distortion effects due to operating in the knee regions of the remanent magnetization curve are illustrated in FIGS. 4 and 5. FIG. 4 shows the knee, the saturation range, and operating point A of the magnetization curve of FIG. 2, and FIG. 5 shows the knee, the saturation range, and the operating point B of FIG. 2. A sine wave representing the AC signal flux is shown operating about point A in FIG. 4 and operating about point B in FIG. 5. The AC signal on one-half cycle in FIG. 4 drives the flux into saturation and on the other half cycle drives the flux away from saturation; simultaneously and alternately, the same sine wave, as shown in FIG. 5, performs the inverse of the first operation about point B. It has been found by experimentation that the two points A and B, as shown in FIG. 2, do not have to be at symmetrical points from the origin. The resultant flux from gap 18 in the portion **22*a* of record medium 22 at one instant (as shown in FIG. 1) is the AC flux subtracted from the DC flux. At the same time this condition exists, the same AC flux is added to the DC flux at portion 22*b* of record medium 22 from gap 20. Thus the record medium adjacent gap 18 is driven away from saturation, while at gap 20** it is driven toward saturation.

Figure 3:
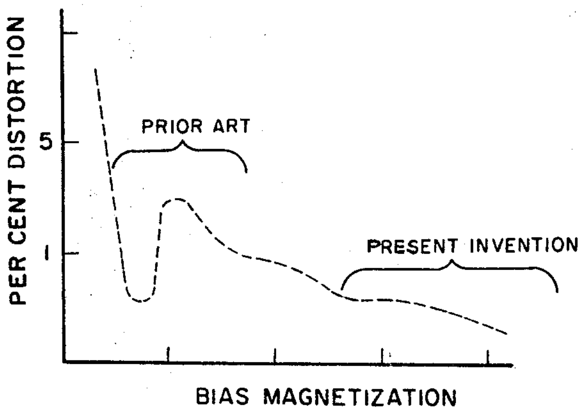
FIG. 3 is a graph of bias magnetization v. percent distortion in the reproduced signal.

When the records on the two tracks are reproduced, either by the head 12 in FIG. 1 or by any conventional single gap head, the resultant waveform for a recorded sinusoidal signal is as shown in FIG. 6. While individual playback signals from tracks **22*a* and 22*b* are as shown in FIG. 4 and FIG. 5, the result of the two nonlinear waveforms is a linear reproduction of the input sinusoidal wave with about 1 percent distortion. The two knee portions of the remanent magnetization characteristic curve, adhering to square law theory, add to form a linear function as shown in FIG. 6; therefore, the two waveforms add to form the sinusoidal output. This result can be shown in FIG. 3 as a magnetic recording operation in the outer region of this curve. It can be seen in this curve that a small movement does not destroy the approximately 1 percent distortion figure. It should be noted that prior art techniques could operate at approximately 1 percent distortion if recording at one frequency and at relatively high, constant, AC signal levels (valley of the curve as shown in FIG. 3**). However, in the past, it has been extremely difficult to stabilize over varying conditions and through the depth of the record medium. Thus, the prior art distortion can be viewed as an averaging of operating points on the side of the valley which is generally about 5 percent distortion.

In accordance with another aspect of the present invention and referring to FIG. 1 of the drawing, the DC bias may be applied to the terminals 34 of coil means 30 to establish magnetic flux in core portion 16 as shown by the arrows 40. In this embodiment the DC magnetic flux crosses the gaps 18 and 20 in the same direction. Simultaneously, the AC signal to be recorded is applied to terminals 32 of coil means 28 and an AC magnetic flux is established in the core portion 14 as shown by arrows 38. This AC flux, at any given instant, crosses the transducing gap 18 in one direction and transducing gap 20 in the opposite direction. By experiment, it has been found that this method of magnetic recording operates essentially at the same power level and distortion level as the first embodiment. It should be pointed out that, in this aspect of the invention the head shown in FIG. 1 may be used to play back the recorded signal, but a conventional head cannot.

Prior to recording, the magnetic record medium can be either neutral or premagnetized to a condition at or near saturation. If premagnetization is to be used, the magnetic record medium must be premagnetized to the opposite polarity of the DC bias to be applied. This premagnetization increases the length of the knee portion of the remanent magnetization curve and therefore increases the dynamic operating range. Thus, a wider operating range is available before the square law effect of the knee portion is lost. In the first described embodiment a split or two-track head would have to be employed to premagnetize each track to a condition at or near the saturation range; and in the second described embodiment the magnetic record medium can be premagnetized to a condition at or near saturation by a single gap head.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What I claim as new and desire to secure by Letters Patent of the United States is:

I claim:

1. A method of magnetic recording having a flux producing means in combination with a moving magnetic record medium having a remanent magnetization characteristic with substantially square law knee portions comprising:
   applying DC bias flux from said flux producing means to a first portion of said record medium to bias said first portion of said record medium to one of said knee portions;
   simultaneously applying DC bias flux from said flux producing means to a second portion of said record medium to bias said second portion of one of the said knee portions;
   simultaneously applying from said flux producing means to both portions of said record medium an AC signal flux, said AC signal flux adding to the DC bias flux applied to said first portion when said AC flux is subtracting from the DC bias flux applied to said second portion;
   the magnitudes of the said bias and AC signal fluxes being so selected that the combined flux applied to said first portion of said record medium, and the combined flux applied to said second portion each remains within the limits of said substantially square law knee portions.

2. A method of magnetic recording as provided in claim 1 wherein said first portion and said second portion of said record medium are biased to opposite polarities.

3. A method of magnetic recording as provided in claim 1 wherein said DC bias flux is applied from said flux producing means to said first portion and to said second portion of said record medium to bias said first and second portions of said record medium both to nearly the same remanent flux level.

4. A method of magnetic recording as provided in claim 1 wherein said first portion and said second portion of said record medium are equal in width and located transversely adjacent each other in respect to the length of said record medium.

5. A method of magnetic recording as provided in claim 1 wherein said first portion and said second portion of said record medium are biased to the same polarity.